(12) United States Patent
Doyen et al.

(10) Patent No.: US 11,127,146 B2
(45) Date of Patent: Sep. 21, 2021

(54) METHOD FOR GENERATING LAYERED DEPTH DATA OF A SCENE

(71) Applicant: InterDigital VC Holdings, Inc., Wilmington, DE (US)

(72) Inventors: Didier Doyen, La Bouexière (FR); Guillaume Boisson, Pleumeleuc (FR); Sylvain Thiebaud, Noyal sur Vilaine (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 30 days.

(21) Appl. No.: 16/319,090

(22) PCT Filed: Jul. 21, 2017

(86) PCT No.: PCT/EP2017/068525
§ 371 (c)(1),
(2) Date: Jan. 18, 2019

(87) PCT Pub. No.: WO2018/015555
PCT Pub. Date: Jan. 25, 2018

(65) Prior Publication Data
US 2019/0385323 A1 Dec. 19, 2019

(30) Foreign Application Priority Data
Jul. 21, 2016 (EP) .................... 16305933

(51) Int. Cl.
*G06K 9/00* (2006.01)
*G06T 7/557* (2017.01)
(Continued)

(52) U.S. Cl.
CPC ............ *G06T 7/557* (2017.01); *H04N 13/111* (2018.05); *H04N 13/128* (2018.05); *G06T 15/205* (2013.01)

(58) Field of Classification Search
CPC ............... H04N 13/128; H04N 19/597; H04N 2213/003; H04N 19/30; H04N 13/161;
(Continued)

(56) References Cited

U.S. PATENT DOCUMENTS 6,252,974 B1 * 6/2001 Martens .................. G06T 7/262
382/107
8,098,728 B2 * 1/2012 Winder .................. H04N 19/96
375/240.12
(Continued)

FOREIGN PATENT DOCUMENTS

| EP | 2180449 | 4/2010 |
| KR | 20150078273 A | 7/2015 |
| WO | WO2015074718 | 5/2015 |

OTHER PUBLICATIONS

Lin et al., "Occlusion-aware layered scene recovery from light fields," 20th IEEE International Conference on Image Processing, ICIP 2013, Sep. 15-18, 2013.
(Continued)

*Primary Examiner* — Guillermo M Rivera-Martinez
(74) *Attorney, Agent, or Firm* — Lily Neff

(57) ABSTRACT

The invention relates to layered depth data. In multi-view images, there is a large amount of redundancy between images. Layered Depth Video format is a well-known formatting solution for formatting multi-view images which reduces the amount of redundant information between images. In LDV, a reference central image is selected and information brought by other images of the multi-view images that are mainly regions occluded in the central image are provided. However, LDV format contains a single horizontal occlusion layer, and thus fails rendering viewpoints that uncover multiple layers dis-occlusions. The invention uses light filed content which offers disparities in every directions and enables a change in viewpoint in a plurality (Continued)

of directions distinct from the viewing direction of the considered image enabling to render viewpoints that may uncover multiple layer dis-occlusions which may occurs with complex scenes viewed with wide inter-axial distance.

3 Claims, 5 Drawing Sheets

(51) Int. Cl.
*H04N 13/128* (2018.01)
*H04N 13/111* (2018.01)
*G06T 15/20* (2011.01)

(58) Field of Classification Search
CPC .... H04N 13/10; H04N 13/178; H04N 13/261; H04N 19/23; H04N 19/46; H04N 13/111; H04N 19/17; H04N 19/187; H04N 13/239; H04N 13/395; H04N 21/234; H04N 5/2226; H04N 5/45; H04N 13/232; H04N 2013/0081; G06T 15/40; G06T 15/10; G06T 15/20; G06T 15/205; G06T 17/00; G06T 19/00; G06T 15/00; G06T 1/0085; G06T 2200/21; G06T 2207/10052; G06T 7/557; G06T 7/251; G06T 7/593; G06T 1/0028; G06F 3/04815; G06F 3/011; G03H 2210/42; G06K 9/32; G02B 2027/0138; G02B 2027/014; G09G 3/003
USPC .......... 382/154, 284; 348/43, 340; 345/419, 345/427
See application file for complete search history.

(56) References Cited

U.S. PATENT DOCUMENTS

| | | |
|---|---|---|
| 2010/0215251 A1* | 8/2010 | Klein Gunnewiek ................. H04N 13/128 382/154 |
| 2010/0231689 A1 | 9/2010 | Bruls et al. |
| 2011/0149037 A1 | 6/2011 | Van Der Horst et al. |
| 2011/0199379 A1* | 8/2011 | Benien .................. G06T 15/205 345/427 |
| 2011/0205226 A1 | 8/2011 | Gremse et al. |
| 2011/0304691 A1* | 12/2011 | Newton ............... H04N 13/293 348/43 |
| 2012/0114225 A1 | 5/2012 | Lim et al. |
| 2012/0188341 A1* | 7/2012 | Klein Gunnewiek ................. H04N 13/111 348/43 |
| 2012/0249750 A1* | 10/2012 | Izzat .................... H04N 13/144 348/47 |
| 2012/0293504 A1* | 11/2012 | Choo .................... H04N 13/161 345/419 |
| 2013/0215220 A1* | 8/2013 | Wang ................... H04N 13/271 348/43 |
| 2014/0132820 A1 | 5/2014 | Difrancesco et al. |
| 2014/0176540 A1* | 6/2014 | Tosic ..................... G06T 17/00 345/420 |
| 2015/0117756 A1* | 4/2015 | Tosic ..................... G06T 7/557 382/154 |
| 2015/0125093 A1* | 5/2015 | Jeong .................... G06T 11/60 382/284 |
| 2015/0237323 A1* | 8/2015 | Du ........................ G06T 1/0028 348/43 |
| 2017/0256059 A1* | 9/2017 | Tosic ....................... G06T 7/11 |
| 2018/0097867 A1* | 4/2018 | Pang .................... H04N 13/349 |

OTHER PUBLICATIONS

Tosic et al., "Geometry-based distributed coding of multi-view omnidirectional images," 15th IEEE International Conference on Image Processing, ICIP 2008, pp. 2220-2223, Oct. 12-15, 2008.

Shade et al., "Layered Depth Images," Proceedings of the 25th annual conference on Computer graphics and interactive techniques SIGGRAPH '98, pp. 231-242, Orlando Florida, Jul. 19-24, 1998.

Drazic et al., "A precise real-time stereo algorithm," Proceedings of the 27th Conference on Image and Vision Computing New Zealand IVCNZ '12, Dunedin, New Zealand, Nov. 26-28, 2012, pp. 138-143.

Min-Jung Kim et al., Estimation of Depth Map in Light Field Camera Using Multi-Information Integrated Cost Volume, 2014—26th Workshop on Understanding of Image Processing.

Fukushima et al.; "Real-Time Free Viewpoint Image Rendering by Using Fast Multi-Pass Dynamic Programming," 3DTV-Conference: The True Vision—Capture, Transmission And Display of 3D Video (3DTV-CON), 2010, IEEE, Piscataway, NJ, USA, Jun. 7, 2010, pp. 1-4.

Seung-Uk Yoon et al.. Representation, Encoding and Intermediate Methods for Multii-View Video Using Layered Depth Images, 2007, Telecommunication Review, vol. 17, Issue 6, pp. 1144-1156.

* cited by examiner

METHOD FOR GENERATING LAYERED DEPTH DATA OF A SCENE

This application claims the benefit, under 35 U.S.C. § 371 of International Application No. PCT/EP2017/068525, filed Jul. 21, 2017, which was published on Jan. 25, 2018, which claims the benefit of European Patent Application No. EP16305933.0 filed Jul. 21, 2016.

TECHNICAL FIELD

The present invention relates to layered depth data and more precisely to a layered format exploiting properties of light field contents, whether those light field contents are video or pictures.

BACKGROUND

In stereo or multi-views system only the horizontal dimension of a scene is considered when formatting data. In the case of acquisition systems composed, for example, of camera rigs where the cameras are aligned horizontally, only the horizontal disparity between the 3D views can be extracted. Depth Image Based Rendering techniques are well known to interpolate intermediate views between captured ones but always in the horizontal direction.

In multi-view images, there is a large amount of redundancy between images. Layered Depth Video format or LDV is a well-known formatting solution for formatting multi-view images which reduces the amount of redundant information between images. In LDV, a reference central image is selected and information brought by other images of the multi-view images that are mainly regions occluded in the central image are provided. LDV format is then composed of four layers representing the necessary information to process multi-view images:
  the selected central image,
  a depth map associated to the selected central image,
  an occlusion image,
  and a depth occlusion map.

Thus only information that are not redundant are transmitted to a rendering device. These information are comprised in an occlusion mask generated from the depth occlusion map.

As it is the case with other formats used in a multi-view context, LDV format contains a single horizontal occlusion layer, and thus fails rendering viewpoints that uncover multiple layers dis-occlusions, which can occur with complex scenes seen with wide inter-axial distance.

The present invention has been devised with the foregoing in mind.

SUMMARY OF INVENTION

According to a first aspect of the invention there is provided a computer implemented method for generating layered depth data of a scene comprising:
  computing a depth map of an image from a light-field content representing the scene, said image being viewed according to a given viewing direction,
  computing, in a first direction distinct from the viewing direction of the image from the light field content, a first set of occlusion information associated with the image from the light field content,
  computing, at least in a second direction distinct from the viewing direction of the image from the light field content and from the first direction, at least a second set of occlusion information associated with the image from the light field content,
  aggregating the image from the light field content, the depth map, the first set of occlusion information and the second set of occlusion information in order to generate the layered depth data of the scene.

The method according to an embodiment of the invention is not limited to light-field content directly acquired by an optical device. These content may be Computer Graphics Images (CGI) that are totally or partially simulated by a computer for a given scene description. Another source of light-field content may be post-produced data that are modified, for instance colour graded, light-field content obtained from an optical device or CGI. It is also now common in the movie industry to have data that are a mix of both data acquired using an optical acquisition device, and CGI data.

The method according to an embodiment of the invention relies on the use of light filed content which offers disparities in every directions and enables a change in viewpoint in a plurality of directions distinct from the viewing direction of the considered image.

Such a method relying on the use of light field content enables to render viewpoints that may uncover multiple layer dis-occlusions which may occurs with complex scenes viewed with wide inter-axial distance.

The layered depth data generated according to the above-mentioned method comprise at least an image from the light field content, the depth map associated to said image, the first set of occlusion information and the second set of occlusion information associated to said image.

In an embodiment of the invention, the light filed content may be a video content.

According to an embodiment of the method for generating layered depth data, the first set of occlusion information and the second set of occlusion information are merged together in order to generate a third set of occlusion information, said third set of information being aggregated with the image from the light field content, and the depth map in order to generate the layered depth data of the scene.

Merging the first and second set of occlusion information enables to reduce the amount of data to be transmitted and the amount of data to be processed at a receiver side. The merging of the first and second sets of occlusion information leads to the creation of a third set of occlusion information which may take the form a unique occlusion information, representing occlusion information in the two considered directions.

According to an embodiment of the method for generating layered depth data, computing the first and the second set of occlusion information consists in comparing the image of the content light field with another adjacent image from the light field content in the first, respectively the second direction.

For example, considering the first direction to be the horizontal direction in regard to the viewing direction of the image from the light field content, the first set of occlusion information is obtained by comparing the image of the light filed content with an adjacent image from the light field content in the horizontal direction.

Considering the second direction to be the vertical direction in regard to the viewing direction of the image from the light field content, the second set of occlusion information is obtained by comparing the image of the light filed content with an adjacent image from the light field content in the vertical direction.

Another object of the invention concerns an apparatus for generating layered depth data of a scene comprising a processor configured to:
- compute a depth map of an image from a light-field content representing the scene, said image being viewed according to a given viewing direction,
- compute, in a first direction distinct from the viewing direction of the image from the light field content, a first set of occlusion information associated with the image from the light field content,
- compute, at least in a second direction distinct from the viewing direction of the image from the light field content and from the first direction, at least a second set of occlusion information associated with the image from the light field content,
- aggregate the image from the light field content, the depth map, the first set of occlusion information and the second set of occlusion information in order to generate the layered depth data of the scene.

According to an embodiment of the apparatus for generating layered depth data of a scene, the first set of occlusion information and the second set of occlusion information are merged together in order to generate a third set of occlusion information, said third set of information being aggregated with the image from the light field content, and the depth map in order to generate the layered depth data of the scene.

According to an embodiment of the apparatus for generating layered depth data of a scene, computing the first and the second set of occlusion information consists in comparing the image of the content light field with another adjacent image from the light field content in the first, respectively the second direction.

Another object of the invention concerns a method for processing a light field content representing a scene, said method comprising processing said light field content based on layered depth data of the scene associates to the light field content of the scene, the layered depth data comprising a depth map of an image from the light field content, a first set of occlusion information associated with the image from the light field content and computed in a first direction distinct from a viewing direction of the image from the light field content, and at least a second set of occlusion information associated with the image from the light field content and computed in a second direction distinct from a viewing direction of the image from the light field content.

Another object of the invention concerns a signal transmitted by a first apparatus capable of generating layered depth data of a scene, to a second apparatus capable of processing said layered depth data of the scene, said signal carrying a message comprising the layered depth data of the scene, said layered depth data comprising a depth map of an image from a light field content of the scene, a first set of occlusion information associated with the image from the light field content and computed in a first direction distinct from a viewing direction of the image from the light field content, and at least a second set of occlusion information associated with the image from the light field content and computed in a second direction distinct from a viewing direction of the image from the light field content, the processing of the captured image by the second apparatus being based on said layered depth data.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium(a) may be utilized.

A plenoptic camera is able to measure the amount of light traveling along each bundle of rays that intersects a sensor, by arranging a microlens array between a main lens and the sensor. The data acquired by such a camera are called light-field data or light field content. These light-field data can be post-processed to reconstruct images of a scene from different viewpoints. The light-field data can be used to generate a focal stack which comprises a collection of images each having different re-focusing depth. As a result, a user can change a focal point of the images. Compared to a conventional camera, the plenoptic camera can obtain additional information for achieving the reconstruction of the images of a scene from the different viewpoints and re-focusing depth by post-processing.

Thus, it is possible to use these specificities of light-field data in the context of layered depth video.

Figure 1A:
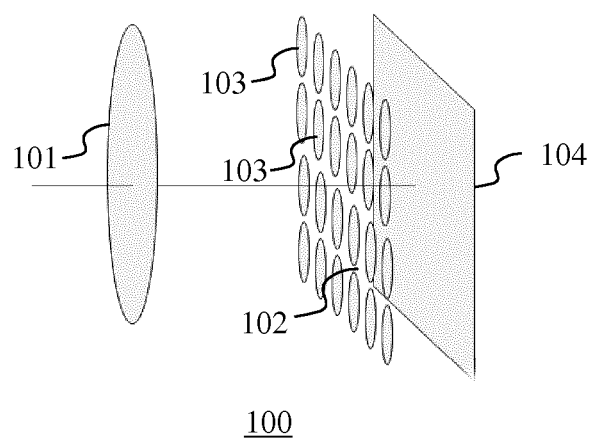
FIG. 1A schematically represents a plenoptic camera.

FIG. 1A is a diagram schematically representing a plenoptic camera 100. Light-field cameras are capable of recording four-dimensional (or 4D) light-field data. The plenoptic camera 100 comprises a main lens 101, a microlens array 102 and an image sensor 104.

Figure 1B:
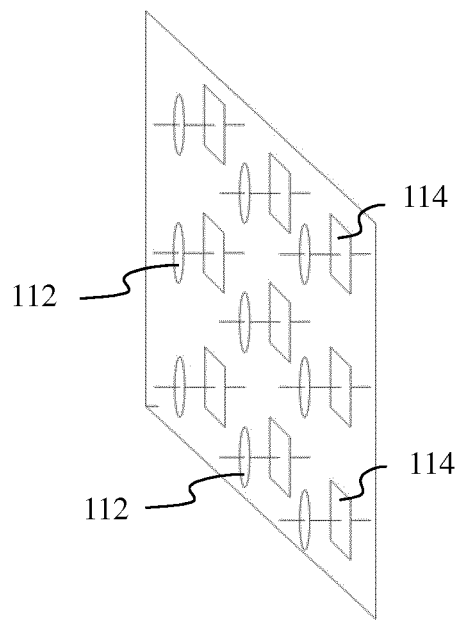
FIG. 1B represents a schematic view of a camera rig.

FIG. 1B represents a schematic view of a camera rig 110. The camera rig 110 comprises a plurality of sensors 114, each of them associated to a lens 112.

In the example of the plenoptic camera 100 as shown in FIG. 1A, the main lens 101 receives light from an object (not shown on the figure) in an object field of the main lens 101 and passes the light through an image field of the main lens 101. The microlens array 102 includes a plurality of microlenses 103 arranged in a two-dimensional array.

Data captured by a light-field camera can be post-processed to reconstruct images of a scene from different points of view. Since a light-field camera is capable of capturing a collection of partial views of a same scene from slightly changed point of views, it is possible to create an image with a customized focus plane by combining those different partial views.

Figure 2A:
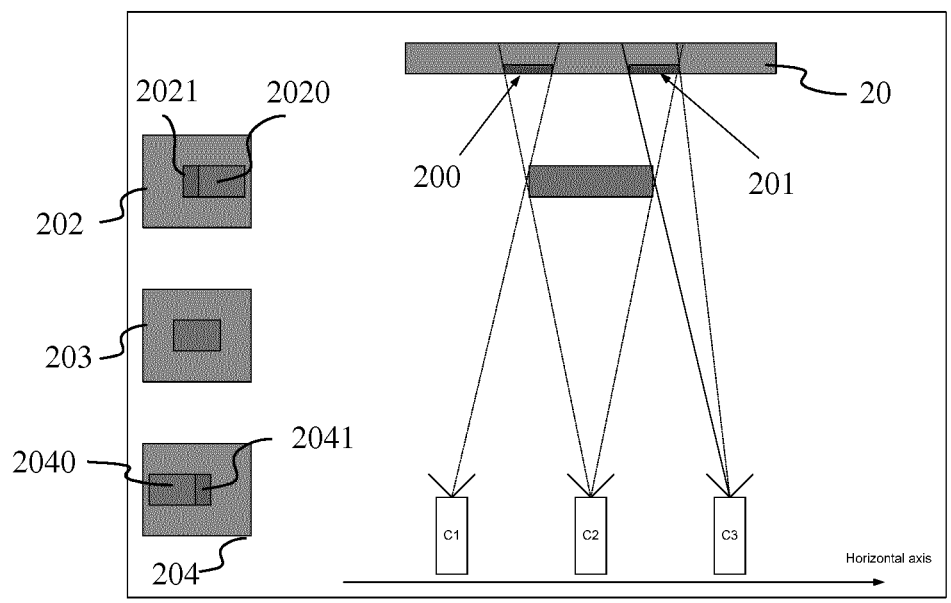
FIG. 2A represent three cameras C1, C2, C3 aligned in a horizontal direction of an array of cameras comprising at least five cameras as well as the portion of space acquired by these cameras.
Figure 2B:
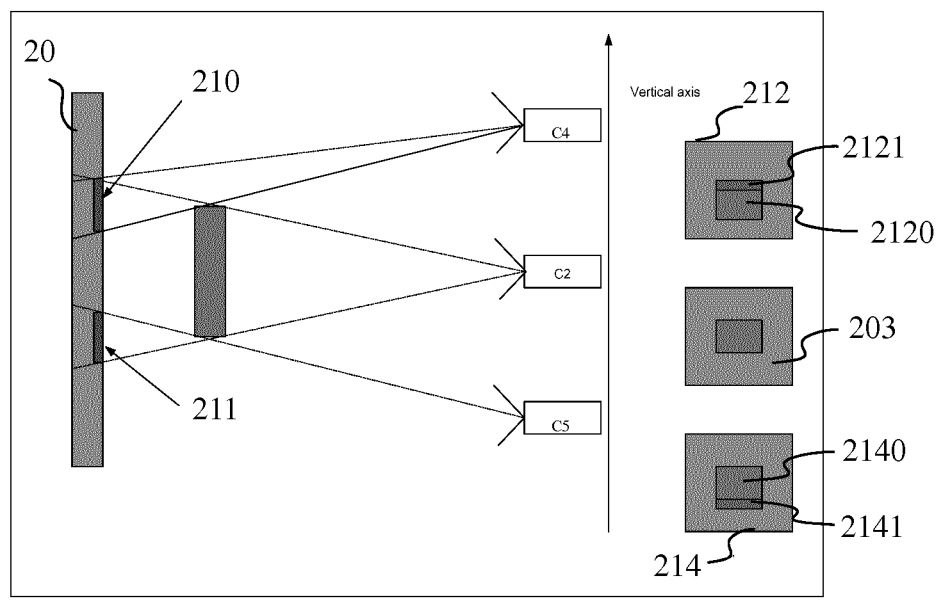
FIG. 2B illustrates three cameras C4, C2, C5 aligned in a vertical direction of an array of cameras comprising at least five cameras as well as the portion of space acquired by these cameras.

FIG. 2A and FIG. 2B represent an array of cameras comprising three cameras C1, C2, C3 aligned in a horizontal direction and three cameras C4, C2, C5 aligned in a vertical direction as well as the portion of space acquired by these cameras. Of course, the number of cameras is not limited to five, there may be less than five cameras or more than five cameras embedded in the array of cameras.

On FIG. 2A, cameras C1, C2 and C3 are aligned along a horizontal axis. A first area 200 of a screen 20 is visible from camera C1 but not from cameras C2 and C3, and a second area 201 of the screen 20 is visible from camera C3 but not from cameras C2 and C1.

Reference 202 on FIG. 2A is an image of the scene as viewed by the camera C1. A first portion 2020 of the image 202 is both viewed by the camera C1 and the camera C2. A second portion 2021 of the image 202 is viewed by the camera C1 and occluded from camera C2.

Reference 203 on FIG. 2A is an image of the scene as viewed by the camera C2.

Reference 204 on FIG. 2A is an image of the scene as viewed by the camera C3. A first portion 2040 of the image 204 is both viewed by the camera C3 and the camera C2. A second portion 2041 of the image 204 is viewed by the camera C3 and occluded from camera C2.

On FIG. 2B, cameras C4, C2 and C5 are aligned along a horizontal axis. A first area 210 of a screen 20 is visible from camera C4 but not from camera C2, and a second area 211 of the screen 20 is visible from camera C5 but not from camera C2.

Reference 212 on FIG. 2B is an image of the scene as viewed by the camera C4. A first portion 2120 of the image 212 is both viewed by the camera C4 and the camera C2. A second portion 2121 of the image 212 is viewed by the camera C4 and occluded from camera C2.

Reference 203 on FIG. 2B is an image of the scene as viewed by the camera C2.

Reference 214 on FIG. 2B is an image of the scene as viewed by the camera C5. A first portion 2140 of the image 214 is both viewed by the camera C5 and the camera C2. A second portion 2141 of the image 214 is viewed by the camera C5 and occluded from camera C2.

Figure 3:
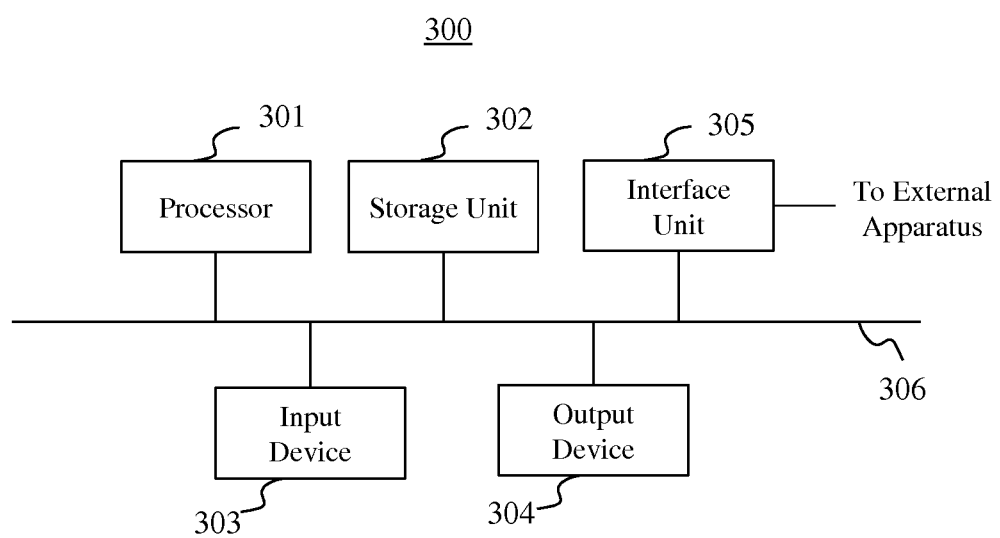
FIG. 3 is a schematic block diagram illustrating an example of an apparatus for obtaining layered depth data of a scene according to an embodiment of the present disclosure.

FIG. 3 is a schematic block diagram illustrating an example of an apparatus for generating layered depth data of a scene according to an embodiment of the present disclosure.

The apparatus 300 comprises a processor 301, a storage unit 302, an input device 303, a display device 304, and an interface unit 305 which are connected by a bus 306. Of course, constituent elements of the computer apparatus 300 may be connected by a connection other than a bus connection.

The processor 301 controls operations of the apparatus 300. The storage unit 302 stores at least one program to be executed by the processor 301, and various data, including data of 4D light-field images captured and provided by a light-field camera, parameters used by computations performed by the processor 301, intermediate data of computations performed by the processor 301, and so on. The processor 301 may be formed by any known and suitable hardware, or software, or a combination of hardware and software. For example, the processor 301 may be formed by dedicated hardware such as a processing circuit, or by a programmable processing unit such as a CPU (Central Processing Unit) that executes a program stored in a memory thereof.

The storage unit 302 may be formed by any suitable storage or means capable of storing the program, data, or the like in a computer-readable manner. Examples of the storage unit 302 include non-transitory computer-readable storage media such as semiconductor memory devices, and magnetic, optical, or magneto-optical recording media loaded into a read and write unit. The program causes the processor 301 to perform a process for obtaining a registration error map representing a level of fuzziness of an image according to an embodiment of the present disclosure as described hereinafter with reference to FIG. 5.

The input device 303 may be formed by a keyboard, a pointing device such as a mouse, or the like for use by the user to input commands, to make user's selections of three-dimensional (or 3D) models of an object of interest used to define a re-focusing surface. The output device 304 may be formed by a display device to display, for example, a Graphical User Interface (GUI), images generated according to an embodiment of the present disclosure. The input device 303 and the output device 304 may be formed integrally by a touchscreen panel, for example.

The interface unit 305 provides an interface between the apparatus 300 and an external apparatus. The interface unit 305 may be communicable with the external apparatus via cable or wireless communication. In an embodiment, the external apparatus may be a light-field camera. In this case, data of 4D light-field images captured by the light-field camera can be input from the light-field camera to the apparatus 300 through the interface unit 305, then stored in the storage unit 302.

In this embodiment the apparatus 300 is exemplary discussed as it is separated from the light-field camera and they are communicable each other via cable or wireless communication, however it should be noted that the apparatus 300 can be integrated with such a light-field camera. In this later case, the apparatus 300 may be for example a portable device such as a tablet or a smartphone embedding a light-field camera.

Figure 4:
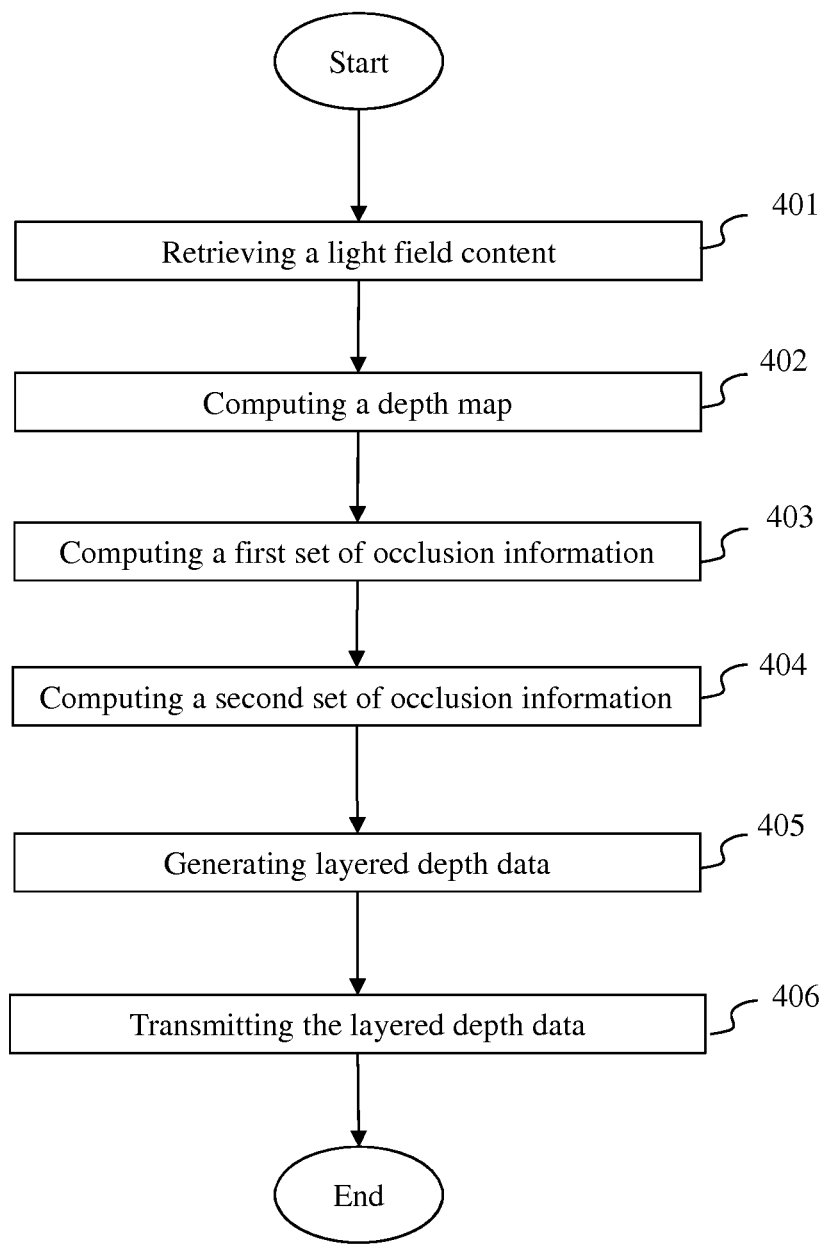
FIG. 4 is a flow chart for explaining a process for generating layered depth data of a scene according to an embodiment of the invention.

FIG. 4 is a flow chart for explaining a process for generating layered depth data of a scene according to an embodiment of the present disclosure.

In a step 401, the processor 301 of the apparatus 300 retrieves a light field content of a scene either captured and provided by a light-field camera or stored in the storage unit 302 of the apparatus 300. In this later case, the light field content is for example Computer Graphics Images (CGI) that are totally or partially simulated by a computer for a given scene description.

In a step 402, the processor 301 of the apparatus 300 computes a depth map for at least one viewpoint of the retrieved light field content. The considered viewpoint from the light field content corresponds to a given viewing direction of the scene. For a given image, information about depth is related to inter-view disparity. Inter-view disparity is an inverse function of the depth to a scale factor depending on focal lengths and inter-axial distances of the optical systems of the light field cameras, actual or virtual, used to acquire the light field content. Inter-view disparity is estimated hierarchically on a per pixel basis by executing a correspondence analysis, as described for example in "A precise real-time stereo algorithm", V. Drazic, N. Sabater, *Proceedings of the 27th Conference on Image and Vision Computing New Zealand*. In order to present smooth depth variations together with sharp edges in the computed depth map, a regularization may be performed, either during the computation of the depth map, using an appropriate regularization cost, or as a post-processing, for example with bilateral filtering.

A depth map is computed for every viewing direction available. For example, when the light field content is acquired by an array of cameras as represented on FIGS. 2A and 2B, the considered image is the image 202 acquired by the camera C2. A left-to-right disparity estimation is performed to get a depth map corresponding to the image 202 acquired by camera C1 located on the left of camera C2. A right-to-left disparity estimation is performed to get a depth map corresponding to the image 204 acquired by camera C3 located on the right of camera C2.

Then, a top-to-bottom disparity estimation is performed to get a depth map corresponding to the image 212 acquired by camera C4 located on the top of camera C2. A bottom-to-top disparity estimation is performed to get a depth map corresponding to the image 214 acquired by camera C5 located on the bottom of camera C2.

In a step 403, the processor 301 computes a first set of occlusion information associated with the image 203 in a first direction distinct from a viewing direction of the image 203.

Occlusions are detected by comparing depth maps associated to two adjacent images such as images 202 and 203 for example. Occlusion occur in areas where depth maps associated to the two adjacent images 203 and 202 are inconsistent. These correspond to the second portion 2021 of the image 202 which is viewed by the camera C1 and occluded for camera C2. Such portions of depth maps, corresponding to the portion 2021 of image 202, are labelled as empty, because the depth estimated by correspondences analysis is not reliable, they are then filled with a conventional method based for example on background propagation, preserving depth gradients and curvatures.

During step 403, another set of occlusion information may be computed by comparing depth maps associated to two adjacent images such as images 203 and 204.

In a step 404, the processor 301 computes a second set of occlusion information associated with the image 203 in a second direction distinct from the viewing direction of the image 203 and distinct from the first direction.

Depth maps associated to two adjacent images such as images 212 and 203 for example are computed. Occlusion occur in areas where depth maps associated to the two adjacent images 203 and 212 are inconsistent. These correspond to the second portion 2121 of the image 212 which is viewed by the camera C4 and occluded for camera C2.

During step 404, another set of occlusion information may be computed by comparing depth maps associated to two adjacent images such as images 213 and 214.

The processor 301 may compute more than two sets of occlusion information associated with the image 203 in other directions distinct from the viewing direction of the image 203 and distinct from the first direction. In a step 405, the processor 301 generates the layered depth data of the scene. The layered depth data generated according to the above-mentioned method comprise at least an image from the light field content, the depth map associated to said image, the first set of occlusion information and the second set of occlusion information associated to said image.

In an embodiment of the invention, the light filed content may be a video content.

Figures 5A, 5B:
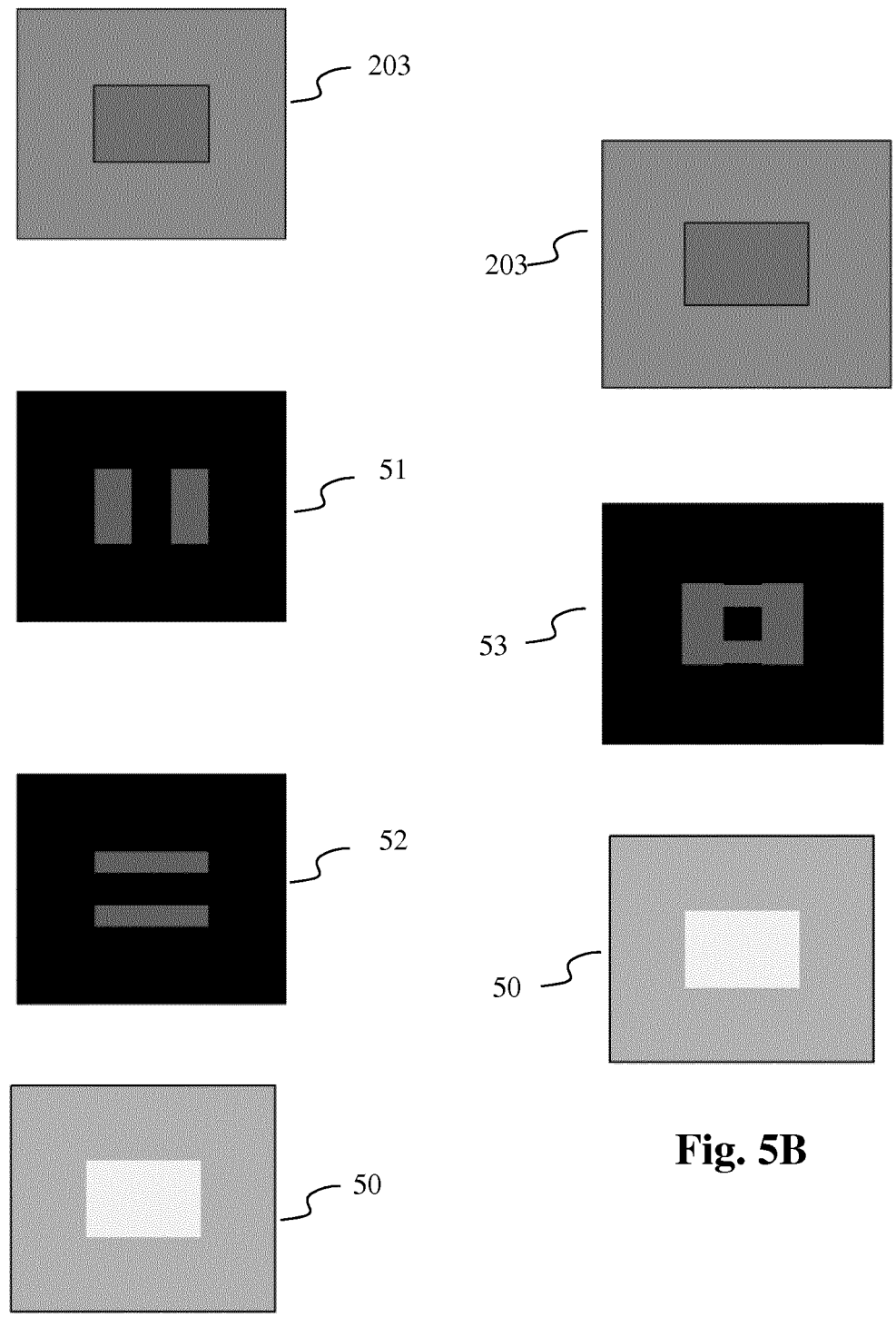
FIG. 5A represents layered depth data of the scene generated according to a first embodiment of the invention.
FIG. 5B represents layered depth data of the scene generated according to a second embodiment of the invention.

In a first embodiment represented on FIG. 5A, the layered depth data of the scene are generated by aggregating the image 203, the depth map 50 associated to image 203, the first set of occlusion information, in the form of an occlusion mask 51 and the second set of occlusion information, in the form of an occlusion mask 52. In a second embodiment represented on FIG. 5B, the layered depth data of the scene are generated by aggregating the image 203, the depth map 50 associated to image 203 and a third set of occlusion information, in the form of an occlusion mask 53.

This third set of occlusion information is computed by merging the first occlusion information and the second set of occlusion information.

For example, the third set of occlusion information may comprise mean values of the first and the second occlusion information. In the case where more than two sets of occlusion information are available, the processor 301 may, for example, select one of them based on an associated confidence criteria as the set of occlusion information to be used for generating the layered depth data.

In a step 406, the layered depth data are then transmitted toward a rendering device or a processing device.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A computer implemented method:

receiving an image of a scene from a light filed content;

generating a disparity estimation to obtain a first and a second depth map of said scene, said image being viewed according to a given viewing direction;

generating in a first direction distinct from the viewing direction of the image from the light field content, a first set of occlusion information associated with the image from the light field content by using said first depth map;

generating, in at least a second direction distinct from the viewing direction of the image from the light field content and from the first direction, at least a second set of occlusion information associated with the image from the light field content by using said second depth map, wherein the first set of occlusion information and the second set of occlusion information are merged together in order to generate a third set of occlusion information by analyzing said first and second depth maps in areas of said image that are inconsistent;

wherein computing the first and the second set of occlusion information includes comparing the image from the light field content with another adjacent image from the light field content in the first direction and the second direction, respectively; and generating a layered depth data of said scene by aggregating the image from the light field content, the first and second depth maps, and the third set of occlusion information.

2. An apparatus comprising a processor configured to:

receive an image of a scene from a light filed content;

generate a disparity estimation to obtain a first depth map and a second depth map of said scene, said image being viewed according to a given viewing direction;

generate, in a first direction distinct from the viewing direction of the image from the light field content, a first set of occlusion information associated with the image from the light field content by using said first depth map;

generate, in at least a second direction distinct from the viewing direction of the image from the light field content and from the first direction, at least a second set of occlusion information associated with the image from the light field content by using said second depth map, wherein the first set of occlusion information and the second set of occlusion information are merged together in order to generate a third set of occlusion information;

wherein computing the first and the second set of occlusion information includes comparing the image from the light field content with another adjacent image from the light field content in the first direction and the second direction, respectively; and generate a layered depth data of said scene by aggregating the image from the light field content, the first and second depth maps, and the third set of occlusion information.

3. A method comprising:

receiving an image of a scene from a light filed content;

generating a disparity estimation to obtain a first and a second depth map of said scene, said image being viewed according to a given viewing direction;

generating in a first direction distinct from the viewing direction of the image from the light field content, a first set of occlusion information associated with the image from the light field content by using said first depth map;

generating, in at least a second direction distinct from the viewing direction of the image from the light field content and from the first direction, at least a second set of occlusion information associated with the image from the light field content by using said second depth map, wherein the first set of occlusion information and the second set of occlusion information are merged together in order to generate a third set of occlusion information by analyzing said first and second depth maps in areas of said image that are inconsistent;

wherein computing the first and the second set of occlusion information includes comparing the image from the light field content with another adjacent image from the light field content in the first direction and the second direction, respectively; and generating a layered depth data of said scene by aggregating the image from the light field content, the first and second depth maps, and the third set of occlusion information.

\* \* \* \* \*